US006312581B1

(12) United States Patent
Bruce et al.

(10) Patent No.: US 6,312,581 B1
(45) Date of Patent: Nov. 6, 2001

(54) PROCESS FOR FABRICATING AN OPTICAL DEVICE

(75) Inventors: Allan James Bruce, Scotch Plains; Alexei Glebov, New Providence; Joseph Shmulovich, Murray Hill, all of NJ (US); Ya-Hong Xie, Beverly Hills, CA (US)

(73) Assignee: Agere Systems Optoelectronics Guardian Corp., Orlando, FL (US)

( * ) Notice: Subject to any disclaimer, the term of this patent is extended or adjusted under 35 U.S.C. 154(b) by 0 days.

(21) Appl. No.: 09/451,433

(22) Filed: Nov. 30, 1999

(51) Int. Cl.$^7$ ........................................... G01B 6/12
(52) U.S. Cl. .................. 205/124; 205/199; 205/221; 205/224; 205/229; 385/14; 385/130; 438/31
(58) Field of Search ..................... 205/124, 224, 205/157, 316, 122, 199, 221, 223, 229; 385/14, 129, 130, 131; 438/31

(56) References Cited

U.S. PATENT DOCUMENTS

| | | | |
|---|---|---|---|
| 4,016,017 | * | 4/1977 | Aboaf et al. ........................ 148/187 |
| 4,532,700 | * | 8/1985 | Kinney et al. ..................... 29/576 W |
| 5,391,269 | | 2/1995 | Fiering et al. .................. 204/129.75 |
| 5,448,586 | | 9/1995 | Shmulovich et al. ................. 372/70 |
| 5,907,791 | | 5/1999 | Cappuzzo et al. .................... 438/669 |

FOREIGN PATENT DOCUMENTS 11-194221 * 7/1999 (JP) .

OTHER PUBLICATIONS

Maiello, G. et al., *Thin Solid Films*, "Light Guiding in Oxidised Porous Silicon Optical Waveguides", pp. 311–313, (1997). Month of publication not available.

Arrand, H. et al., *IEEE Jouranl of Selected Topics in Quantum Electronics*, "The Application of Porous Silicon to Optical Waveguiding Technology", vol. 4, No. 6, pp. 975–982, (1998) Month of publication not available.

Li, Y. et al., *IEE Proc.–Optoelectron*, "Silica–Based Optical Integrated Circuits", vol. 143, No. 5, pp. 263–280, Oct. 1996.

* cited by examiner

Primary Examiner—Kathryn Gorgos
Assistant Examiner—William T. Leader
(74) Attorney, Agent, or Firm—Richard J. Botos

(57) ABSTRACT

A process for fabricating a silica-based optical device on a silicon substrate is disclosed. The device has a cladding formed in a silicon substrate. The device also has an active region, and that active region is formed on the cladding. The cladding is fabricated by forming a region of porous silicon in the silicon substrate. The porous silicon is then oxidized and densified. After densification, the active region of the device is formed on the cladding.

8 Claims, 1 Drawing Sheet

PROCESS FOR FABRICATING AN OPTICAL DEVICE

BACKGROUND OF THE INVENTION

1. Technical Field

The present invention relates to optical devices, and in particular, planar optical waveguides.

2. Art Background

Optical fiber communication systems are becoming more prevalent. In addition to the optical fiber itself, optical fiber communication systems use a wide variety of optical devices for receiving, transmitting, and using optical signals. One type of integrated optical device is a silica optical circuit formed on silicon substrates. The basic structure of such devices is described in Henry, C. H., et al., "Silica-based optical integrated circuits," IEE *Proc.-Optoelectron*, Vol. 143, No. 5, pp. 263–280 (1996). The waveguide is formed from 3 layers; those layers are a lower cladding (referred to as a base in Henry) core and upper cladding. The lower cladding layer isolates the fundamental mode from the silicon substrate. Such isolation prevents optical signal leakage through the silica-silicon (substrate) interface, which, unlike other waveguide interfaces, is not totally reflecting. The refractive index of the upper cladding layer is chosen to be nearly equal to that of the base layer.

The lower cladding layer is made out of undoped or lightly doped silica. This is the most rigid layer and it keeps the core, which is adhered to it, from moving after it is patterned. The other glasses are more highly doped silica.

A variety of processing strategies for fabricating silica-on-silicon, optical devices have been proposed. Such processing strategies typically require that the base layer be deposited on the surface of the silicon substrate. Current techniques for forming the lower cladding are deposition processes such as low-pressure chemical vapor deposition (LPCVD) and high pressure oxidation (HiPOX). While such deposition techniques provide an acceptable lower cladding, these techniques are somewhat slow. Accordingly, alternative techniques for forming the lower cladding for silica-on-silicon optical devices are sought.

SUMMARY OF THE INVENTION

The present invention is directed to a process for forming an optical device in which the lower cladding is formed in the silicon substrate. The lower cladding is fabricated by first forming a region of porous silicon in the silicon substrate. Expedients for forming regions of porous silicon in a substrate are well known to one skilled in the art. It is advantageous if the porous silicon is formed using an electrolytic process. In the electrolytic process, silicon is anodized in an electrolytic solution. Such a technique is described in Unagmi, T., et al., "An Isolation Technique Using Oxidized Porous Silicon," Semiconductor *Technologies*, Vol. 8, Chap. 11, pp. 139–154 (OHMSHAT and North Holland Publishing Company 1983) which is hereby incorporated by reference.

The silicon substrate is anodized selectively to form porous silicon regions therein. The substrate is selectively anodized by forming a mask on the silicon substrate prior to anodization. The mask has at least one opening therein. The underlying silicon substrate surface is exposed through such openings.

Similarly the porosity of the porous silicon region is also largely a matter of design choice. The porosity of the material is controlled by the doping level of the substrate (e.g. silicon wafer) and the anodization conditions used to form the porous areas. Anodization conditions such as an applied voltage and the associated current density as well as the concentration and pH values of the HF solutions are selected to obtain the desired porosity. In determining the degree of porosity, the silicon density reduction caused by generating the porous silicon and the swelling caused by the subsequent oxidation of the porous silicon must be considered. Volume expansion or reduction of the porous silicon region is controlled so that the waveguide structure is not overly stressed by the changes in volume caused by the generation of a porous silicon region and the subsequent oxidation of that region.

Volume expansion and reduction is readily controlled because the relative volume of the porous silicon before and after oxidation is known. Specifically, thermal oxidation of the porous silicon increases the porous silicon volume by a factor of 2.2. It is advantageous if the density of the porous silicon (density is the converse of porosity such that density plus porosity equals 1) is no less than about forty-four percent that of silicon. If the density of the porous silicon is not less than forty-four percent that of silicon, then the volume of the oxidized porous silicon will not exceed the volume of the silicon region converted to porous silicon. That is, the volume increase (2.2) of the porous silicon is such that the volume of the oxidized silicon is roughly equal to the volume of the silicon before it was converted to porous silicon. Mathematically, 2.2 times 0.44 (the density of porous silicon with respect to the density of silicon) is about 1. Approximating a one to one relationship between the volume of silicon prior to anodization and the volume of oxidized porous silicon avoids stress and non-planarity due to volume expansion or contraction.

Conversely, if the density of the porous silicon is significantly less than forty-four percent that of silicon, the surface of the porous silicon region, following oxidation and densification, will be lower than the other portions of the substrate surface. Thus, in order to avoid having a region of silica that is significantly above or below the surface of the substrate, it is advantageous if the porous silicon has a density of forty-four percent (which corresponds to a porosity of 56 percent) that of silicon.

The dimensions of the porous silicon region are largely a matter of design choice. The depth and size of a porous silicon region depends upon the size of the waveguide subsequently formed on the region.

After the region of porous silicon is formed in the substrate, the region is oxidized. The porous silicon is oxidized in an oxygen-containing atmosphere at elevated temperature (e.g. about 850° C. to about 1150° C.). The non-porous silicon is also oxidized under such conditions. However, the oxidation rate of the porous silicon is substantially higher than the oxidation rate of the bulk silicon in the substrate. The amount of bulk silicon that is oxidized is negligible. If necessary, the oxidized bulk silicon is subsequently removed. Specifically the dimension of the silicon skeleton in a porous silicon region is on the order of 100 angstroms. Furthermore, the entire porous silicon region (typically 10–20 microns thick) is exposed to the oxidizing ambient simultaneously. Consequently, the oxidation process for converting the entire porous silicon region into bulk $SiO_2$ is carried out under conditions (e.g. flow rate, H content in $O_2$ gas, furnace temperature, and oxidation time) that only oxidize about 100 angstroms of bulk Si. The resulting thin layer of $SiO_2$ in the non-porous region of the wafer is easily removed after the oxidation without any significant impact on the lower cladding layer.

The oxidized porous silicon is then densified to form silica. In the context of the present invention, densification refers to the collapse of the porous structure of the porous silicon. Densification is accomplished by heating the substrate in an oxygen-containing atmosphere. Again, the bulk silicon is also oxidized, but at a slow rate compared to the rate of densification. Thus, the bulk silicon is only oxidized to a small degree, and the oxidized porous silicon is readily removed, if required.

After the cladding is formed on the substrate, the fabrication of the planar optical devices is completed. Conventional processes and materials for forming planar optical devices are contemplated as suitable. Consequently, fabrication techniques for forming planar optical devices on the oxidized and densified porous silicon are not discussed in detail herein. The core is formed on the oxidized and densified porous silicon region and etched to form the desired pattern. An upper cladding is then formed over the core. Examples of devices that would benefit from being formed in this manner include, planar waveguides, Wavelength Add-Drop (WAD) for Dense Wavelength Division Multiplexing (DWDM) systems, dynamic wavelength equalizers for chromatic equalization in Er-doped fiber amplifier systems; Mach-Zehnder (MZ) based switches, tunable filters, and Y-branch switches.

The present invention provides certain advantages over processes in which the lower cladding layer is deposited on the substrate. An example is the integration of an optical device such as a laser with a waveguide on the same chip. This integration requires that the core of the waveguide be precisely aligned with the optical device. Such alignment is difficult when the waveguide core is deposited on a lower cladding layer that is deposited on the surface of a silicon substrate. This alignment problem is exacerbated if, for optimum performance, the optical device must be located on the surface of the silicon substrate.

In prior art processes this alignment requires additional processing steps. For example, the silicon substrate is locally pre-etched to a depth equivalent to the desired thickness of the lower cladding. Sufficient lower cladding is then deposited to fill or overfill the etched trench. The clad wafer is then mechanically polished to remove the cladding from all regions except in the trench. Selective masking and wet etching is an alternative to mechanical polishing. The core glass is then deposited and patterned to define waveguides only on top of the trench region. This process provides access to the surface of the silicon substrate. However, many complex processing steps (i.e. etch, deposit, polish, etc.) are required to provide a common reference surface for the vertical alignment of the optical device to the waveguide core.

DETAILED DESCRIPTION

The present invention is directed to a method for forming a silica-based optical devices on a silicon substrate. There are a variety of silica-based optical devices. Such devices are well known to one skilled in the art and are not described in detail herein. For convenience, the process of the present invention will be described in the context of fabricating a simple planar waveguide. One skilled in the art will readily appreciate that the present process can be used to fabricate the full range of silica-based optical devices that are formed on a silicon substrate and require a lower cladding.

Figure 1:
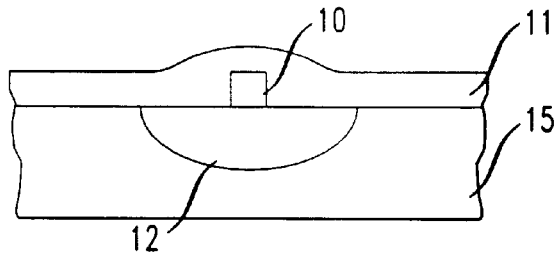
FIG. 1 illustrates an example of an optical device in which the lower cladding is a region of densified, porous silicon formed in a semiconductor substrate.

FIG. 1 illustrates the general structure of a planar waveguide. It consists of three layers: core layer 10; upper clad layer 11; and lower clad 12. In one embodiment, all three layers are silica glass. The core layer is doped with phosphorus. In alternative embodiments, the core and upper cladding layers are plastic. The thickness of the individual layers is a matter of design choice. The appropriate thicknesses for a particular application are readily ascertained by one skilled in the art.

Figure 2A:
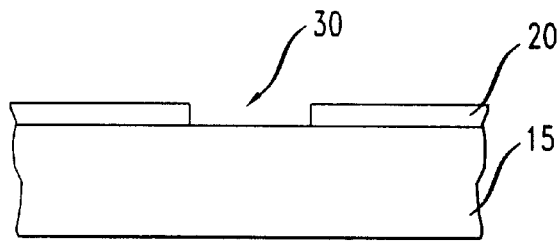
FIGS. 2A–2C illustrate an exemplary process sequence of the present invention.
Figure 2B:
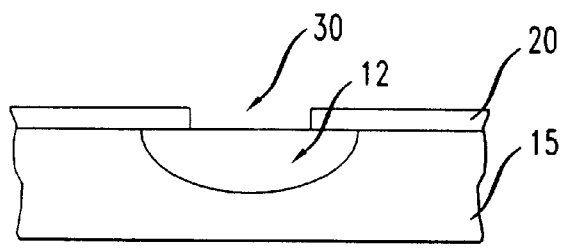
Figure 2C:
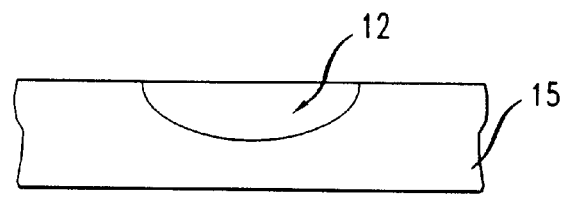

The process of the present invention is described with reference to FIGS. 2A–2C. Referring to FIG. 2A, the lower cladding is formed by depositing a patterned layer of material 20 (i.e. a mask) on the silicon substrate 15. The mask 20 defines the desired cladding region 30, which is the region of the substrate 15 that is exposed through the mask 20. The mask is formed using conventional lithographic techniques that are not described herein but are well known to one skilled in the art.

The structure depicted in FIG. 2A is placed in an anodization bath. The portions of the substrate 15 that are exposed to the anodization bath are converted to a porous silicon region 12 (the porous nature of region 12 is not illustrated in the FIGS.). The anodization proceeds isotropically, and a portion of the substrate underlying the mask 20 is converted to porous silicon. Consequently, the region of porous silicon 12 is larger than the mask opening 30. For example, a porous silicon region with a depth of 15 $\mu$m will also extend 15 $\mu$m underneath the mask 20.

A variety of mask materials are contemplated as suitable. Examples of suitable mask materials include photoresist, nitride, oxide, and carbide of silicon, polycrystalline silicon, and metals that are not soluble in HF solutions (e.g., gold, platinum etc.). Different masking materials have different etch-resistances for HF and thus should be chosen according to desired etch time and the process complexity.

After the region of porous silicon 12 is formed in the substrate 15, the mask 20 is stripped from the substrate 15. The region 12 is substantially fully oxidized (the oxidized nature of the porous silicon region 12 is not illustrated in the FIGS.). In the context of the present invention, substantially fully oxidized means that conditions are selected to effect essentially complete oxidation of the porous silicon region. The conditions for substantially complete oxidation are readily ascertained by one skilled in the art. The selected conditions depend on the dimensions of the porous silicon region in the substrate. For example, complete oxidation of a 15 $\mu$m porous silicon region by heating the porous silicon region to 900° C. in flowing, wet oxygen (100 percent humidity at 850° C.) and holding the porous silicon region under these conditions for two hours. Because the oxidation rate of the porous silicon region, 12 is so much faster than the oxidation rate of the silicon substrate 15, the substrate 15 is not oxidized to a substantial degree. To the extent that the substrate 15 is oxidized, such oxidized silicon is readily removed using conventional techniques. The thin layer of oxide that forms on the surface of substrate 15 is not shown in the Figure.

After oxidation, the oxidized porous silicon region 12 is densified. During densification, the pores in the porous silicon region collapse and the porous silicon region is transformed into a dense glass region. The mechanism of densification is viscous flow. Therefore, the oxidized porous silicon must be heated to above its glass transition temperature ($T_g$) for this mechanism to occur. Suitable conditions for densification are readily ascertained by one skilled in the art. For example, densification occurs when the oxidized porous silicon is subjected to elevated temperatures (e.g. 1150° C.) in an atmosphere of wet oxygen for about two hours. Because the rate at which the porous silicon region, 12, is densified is so much faster than the oxidation rate of the silicon substrate 15, the substrate 15 is not oxidized to a substantial degree. To the extent that the substrate 15 is oxidized, such oxidized silicon is readily removed using conventional techniques.

In certain embodiments, it is advantageous if the porous silicon is stabilized prior to oxidation and densification. Stabilization occurs using conditions that provide a few monolayers of oxide on the surface of the substrate 15. Suitable conditions are well known to one skilled in the art. Heating the wafers to a temperature of about 300° C. in a dry oxygen atmosphere for about one hour stabilizes the porous silicon. The stabilization conditions are selected to prevent the porous silicon from oxidizing if it were stored at ambient temperature in an oxygen-containing atmosphere for some period of time before oxidation and densification.

Referring to FIG. 1, the core 10 is then formed on the cladding region 12 using conventional techniques not described herein. The upper cladding 11 is then formed over the core 10, again using conventional techniques.

EXAMPLE

Doped, silicon wafers doped with a resistivity of 0.01Ω-cm were cleaned and coated with an energy sensitive resist material, Shipley 1822 that was obtained from the Shipley Co. of Marlborough, Mass. The layer of energy sensitive material was formed on the silicon substrate using standard conditions.

A pattern was delineated into the energy sensitive material. The pattern defined the lower cladding for a variety of optical devices, (i.e. straight waveguides, coupler and Mach-Zender devices). The smallest dimensions in the pattern were in the range of about 5 $\mu$m to about 7 $\mu$m. The same mask was used to define cores. Because anodization to form porous silicon is an isotropic process, the porous silicon region extended under the mask. Consequently, the dimensions of the porous silicon regions were larger than the mask dimensions (e.g the depth of the porous silicon region was 15 $\mu$m and the porous silicon region extended a distance of 15 $\mu$m under the mask. The pattern was delineated in the energy sensitive resist material using standard lithographic techniques. First, an image was transferred into the energy sensitive material by exposing the resist to patterned radiation. The image was then developed into a pattern by removing the portions of the energy sensitive material that were exposed to radiation. Removing portions of the energy sensitive material exposed the surface of the silicon substrate underlying those portions. The pattern of the removed portions corresponded to the mask pattern.

After the pattern was developed, the resist was baked at 150° C. for 2 minutes. This was done to increase the stability of the resist during subsequent processing.

The substrate with the patterned masking layer thereon was then subjected to a set of conditions that electrochemically etches silicon. The electrochemical cell used here was a standard double-tank cell. A cell of this type is described in Lang, W. et al., *Sensors and Actuators* A 51, pp. 31–36 (1995). In the double-tank cell the wafer was immersed in HF solution such that that both sides were immersed in solution and the wafer formed a barrier between two half-cells. Two platinum electrodes were located in each half-cell on both sides of the wafer. The electrical contact to the backside of the wafer was formed electrolytically, and the corresponding platinum electrode was the anode. The platinum electrode in the other half-cell was under cathodic potential. The two platinum electrodes were connected to the power supply that drives the current through the wafer. The front side of the wafer is anodically etched and porous silicon is formed at the areas not covered with the mask. The electrolyte was 25 weight percent ethanoic solution of hydrofluoric acid (HF). A current density of 150 mA/cm$^2$ provided an etch rate of 6.5 $\mu$m/min and a porosity of about 55%. After the porous layer of 5–20 $\mu$m thickness was formed the current was shut off and the substrate wafer was removed from the cell. The mask was stripped off of the substrate surface. The resist mask was removed in a bath of a standard organic resist stripper.

After the porous silicon region was formed in the substrate, the substrate was heated to 300° C. and held for two hours in an oxygen atmosphere. The substrate was heated to 900° C. in an atmosphere of wet (100 percent humidity at 85° C.) oxygen (flowing) and held there for two hours hour. The porous silicon was oxidized but did not measurably expand in the vertical direction, i.e., it remained planar with the substrate surface. Because the porous silicon surface did not increase or decrease in elevation compared to the rest of the substrate surface, further processing was complicated by the presence of the porous silicon region.

The porous silicon was then densified by heating the wafer to 1150° C. in an atmosphere of wet flowing oxygen. The wafer was held in this atmosphere for two hours. The wafer was then cooled to room temperature at a rate of about 100° C. per hour.

A layer of doped glass material was then deposited on the densified porous silicon region. The doped glass was silica doped with phosphorus (seven weight percent). The doped glass material was deposited using LPCVD. The dopants were introduced into the glass in situ.

The core of the optical device was then formed by patterning the doped glass layer. An etch mask layer was formed over the doped glass layer. The etch mask layer was then patterned, so that the remaining portion of the etch mask layer defined the core of the optical device being formed. The doped glass material was then etched using reactive ion etching (RIE). After etching, the portion of the doped glass layer that remains is the core of the optical device. The remaining portion of the RIE etch mask was then removed.

Another layer of silica glass is formed over the substrate. The layer of silica glass was deposited using LPCVD from tetraethyl orthosilicate (TEOS) precursors. The glass composition silica doped with boron (five weight percent) and phosphorus (2 weight percent).

The completed devices were evaluated for their performance, which was normal. The total insertion loss for a straight waveguide (6 cm in length) was about 1.2 dB. Consequently, the propagation loss for the waveguide was about 0.2 dB/cm. The propagation loss was actually lower, because, out of the total 1.2 dB, about 0.4 dB to about 0.5 dB were coupling losses between the waveguide and the input and output fibers. Therefore, the propagation loss of the waveguide was actually about 0.15 dB/cm.

The invention has been described in terms of specific embodiments and examples. These embodiments and examples are provided to illustrate the invention and are not intended to limit the invention except as is consistent with the claims.

What is claimed is:

1. A method for fabricating an optical device comprising:
   forming a region of porous silicon in a silicon substrate by anodization;
   oxidizing the region of porous silicon;
   densifying the region of porous silicon; and
   forming an active portion of an optical device on the densified porous silicon.

2. The method of claim 1 wherein the region of porous silicon is defined by a mask formed on the silicon substrate prior to anodization.

3. The method of claim 1 wherein the density of the porous silicon is about forty-four percent.

4. The method of claim 1 wherein the region of porous silicon is oxidized by heating the substrate to a temperature of about 850° C. to about 1150° C. in an oxygen-containing atmosphere.

5. The method of claim 4 wherein the duration of the oxidizing step is sufficient to substantially completely oxidize the porous silicon region.

6. The method of claim 1 wherein the oxidized porous silicon is densified using conditions that convert the oxidized porous silicon to silica.

7. The process of claim 6 wherein the porous silicon is densified by heating the substrate in an oxygen-containing atmosphere.

8. The process of claim 1 further comprising stabilizing the porous silicon region prior to the oxidizing step.

* * * * *